Oct. 13, 1942.    K. M. WATSON ET AL    2,298,442
TREATMENT OF HYDROCARBONS
Filed May 25, 1940    2 Sheets-Sheet 2

INVENTORS
KENNETH M. WATSON
ROBERT L. SMITH
BY ATTORNEY

Patented Oct. 13, 1942

2,298,442

UNITED STATES PATENT OFFICE 2,298,442

TREATMENT OF HYDROCARBONS

Kenneth M. Watson and Robert L. Smith, Chicago, Ill., assignors to Universal Oil Products Company, Chicago, Ill., a corporation of Delaware Application May 25, 1940, Serial No. 337,168

3 Claims. (Cl. 252—242)

This invention relates to a process for accomplishing catalytic endothermic hydrocarbon conversion reactions under substantially adiabatic conditions and to the method for regenerating the catalytic material in situ without using extraneous cooling means to remove the exothermic heat of reactivation but on the other hand removing such heat as sensible heat in the reactivating gases.

In the catalytic conversion of hydrocarbons wherein the reaction is endothermic (requiring heat), such as, for example, catalytic cracking, dehydrogenation, and aromatization, the practice has been to supply heat to the zone during the period in which the hydrocarbons are in contact with the catalyst mass in order to maintain the desired conversion temperature and to employ some form of extraneous cooling during the period in which the catalytic material is undergoing reactivation so as to quickly remove the exothermic heat of reactivation and thus avoid overheating of the catalytic material. One of the more common methods for accomplishing this may involve the use of a reactor containing a plurality of relatively small diameter tubes containing the catalytic material, the tubes being surrounded with a suitable fluid medium for the purpose of supplying heat to the endothermic reaction or removing heat during the exothermic reaction. Another type of reaction vessel which has been employed in accomplishing the reactions above described is that which contains a plurality of tubular elements surrounded by catalytic material and means for introducing a fluid cooling or heating medium to the tubular elements for the purpose of abstracting heat from the surrounding hydrocarbons and catalytic material or for the purpose of adding heat.

In reactors of the type presently employed, due to the fact that they contain relatively deep beds of catalytic material, the pressure drop is ordinarily high necessitating the use of high inlet pressures which is not always desirable. This is particularly true where the catalytic material is contained in the small diameter tubular elements for, in most cases, in order to economically obtain the desired capacity and at the same time employ space velocities, (i. e., the unit volume of hydrocarbons brought in contact with a unit volume of catalyst per unit of time), within the desired range, relatively long tubular elements are employed. In such cases, during regeneration of the catalytic material, even though external cooling is employed, temperatures during the regeneration may exceed the maximum allowable temperature to which the catalyst may be subjected and thereby damage the catalyst to such an extent that its activity is materially decreased during the subsequent processing periods.

One common difficulty encountered in all reactors containing relatively deep beds of catalytic material is powdering of the catalyst due to the relatively heavy load which it supports resulting in channeling of the hydrocarbons through the bed of catalytic material and greater deposition of carbonaceous materials in some parts of the bed of catalytic material than in other parts of the bed. Relatively deep beds, in many cases, are also objectionable from the standpoint of obtaining uniformity of operation in systems employing two reaction zones, for example, because in such cases it is usually very difficult to balance the process and reactivating periods, the latter usually requiring more time for complete reactivation than the desired length of the process period.

In view of the above we employ in our process relatively shallow beds of catalytic material and to accomplish the objects of the invention, one or more reactors may be employed containing one or more beds of catalytic material. One reactor may, for example, contain a plurality of beds of catalytic material through which the hydrocarbons or reactivating gases pass in parallel flow or it may be operated so that only the reactivating gases pass through the beds of catalytic material in parallel flow while the hydrocarbons pass through the various beds in series. A plurality of separate reactors containing individual beds of catalytic material may also be employed, through which the hydrocarbons or reactivating gases pass in parallel flow or, when desired, in series flow or, on the other hand, series flow during the hydrocarbon conversion reaction and parallel flow while reactivating the catalytic material.

When employing parallel operated relatively shallow beds of catalytic material in each of the reactors, the reactivation time may be decreased to some extent over that ordinarily required in reactivating deep beds, because, due to the decreased pressure drop of the gases passing through the beds, larger volumes with a greater heat capacity may be employed, thus minimizing the danger of overheating the catalytic material when more rapid burning is done. This is on the basis of substantially complete reactivation of the catalytic particles, however, in cases where only the carbonaceous deposit is removed from the surface of the catalyst particles the reactivation time may be reduced to a still lower figure.

In one embodiment the invention comprises introducing the hydrocarbons to be converted to a catalytic reactor containing a plurality of relatively shallow beds of fresh or freshly regenerated catalytic material, passing said hydrocarbons through said beds of catalytic material in series whereby to accomplish the desired reaction and simultaneously therewith supplying regenerating gases to another reactor containing a plurality of relatively shallow beds of catalytic material, passing said regenerating gases through the first bed of catalytic material and thereafter withdrawing a portion of said regenerating gases and restoring the remaining portion thereof to its original volume by introducing cooler regenerating gases from an outside source, passing the resulting cooled regenerating gases through the next successive bed of catalytic material and thereafter withdrawing a portion and replacing this portion with a cooler portion of regenerating gases introduced from an exterior source, thereafter after each successive pass of the regenerating gases through the beds of catalytic material withdrawing a portion and adding a cooler portion to restore the gases to their original volume until the regenerating gases have been passed through each successive bed and alternately operating each of said reactors in processing and regeneration.

In another embodiment the invention comprises passing parallel streams of hydrocarbons to be converted through a group of reactors containing catalytic material capable of promoting the desired reaction, simultaneously therewith passing parallel streams of regenerating gases containing a controlled amount of oxygen through another group of catalytic reactors containing the carbonized catalytic material previously employed in processing, and alternately operating each of said groups of catalytic reactors in processing and reactivation.

The accompanying drawings illustrate diagrammatically in conventional side elevation specific forms of apparatus which may be employed to accomplish the objects of the invention.

Figure 1:
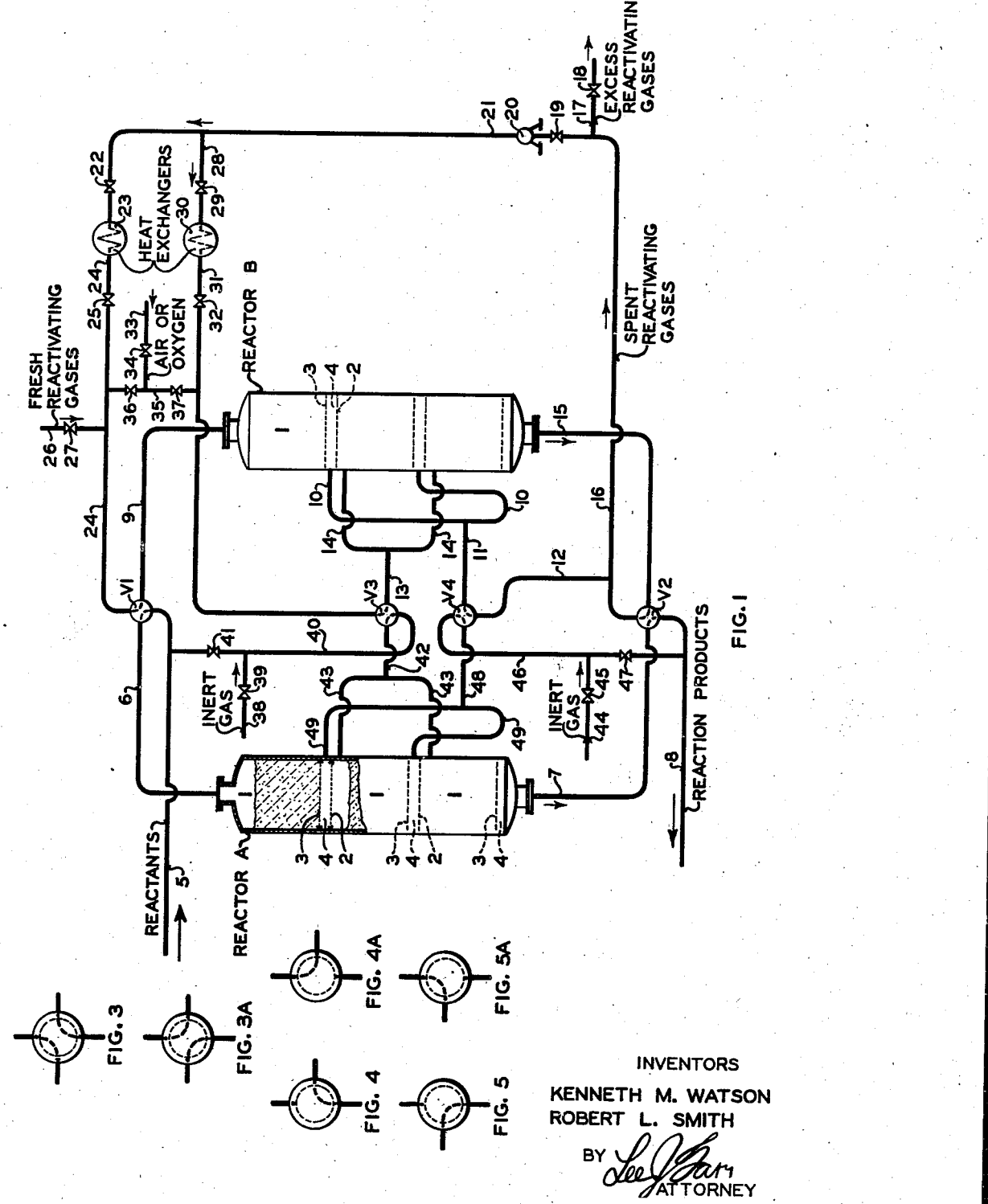
Fig. 1 illustrates the process when employing reactors containing a plurality of beds of catalytic material.
Figure 2:
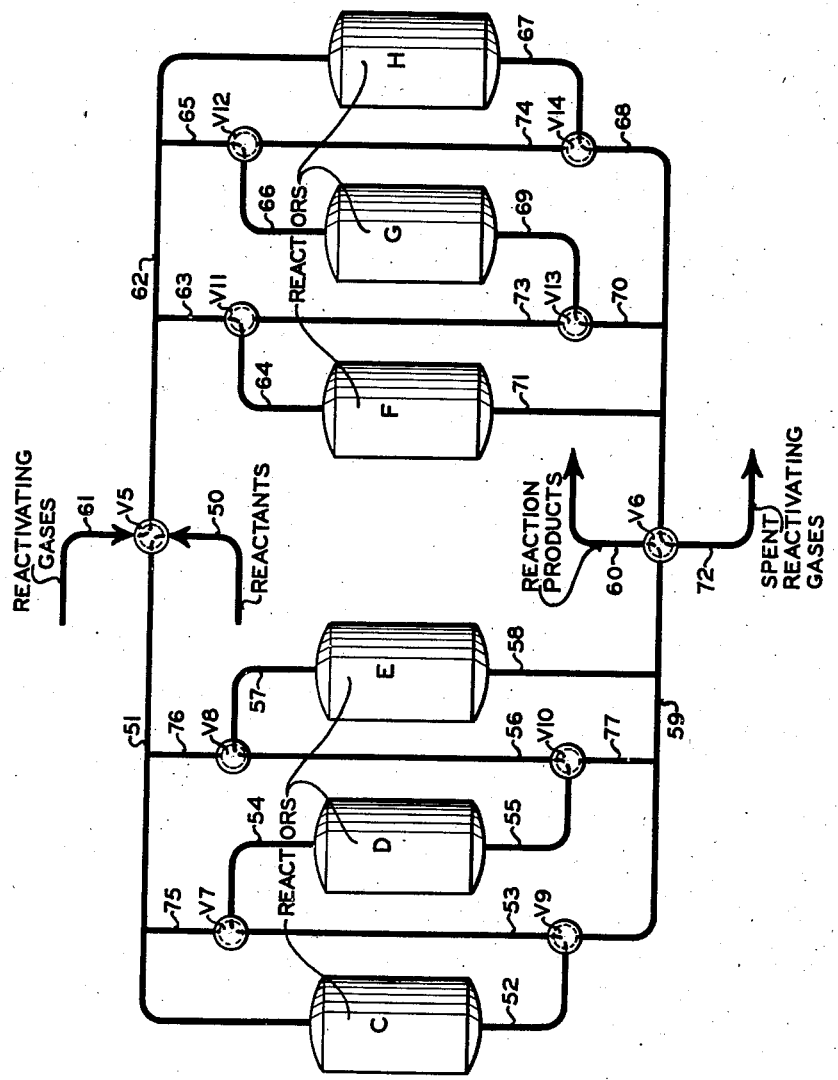
Fig. 2 is an illustration of a process employing a plurality of reactors wherein each reactor contains only a single bed of catalytic material.

Figs. 3 and 3A are details of the 4-way valves diagrammatically indicated in Figs. 1 and 2, while Figs. 4, 4A, 5, and 5A are details of the 3-way valves diagrammatically indicated in Fig. 2; Figs. 3, 4 and 5 showing the valves in one position and Figs. 3A, 4A, and 5A showing the passageways therethrough shifted.

Referring now to Fig. 1, the apparatus as shown consists only of two reactors A and B but a greater or lesser number may be employed, when desired to accomplish the objects of the invention. These reactors are preferably divided into a plurality of compartments 1, each compartment being separated from the next successive compartment by means of partition plates 2 which may be either perforated or solid. In addition, each compartment is provided with a perforated partition plate 3 which forms a compartment 4 with plate 2. In the case here illustrated, catalytic material is supported by the perforated partition plate 3 and partition plate 2 is also perforated in order to provide for series flow of the reactants and reactivating gases through the various beds of catalytic material.

The invention also provides for operating the various compartments in parallel by employing a solid partition plate 2. This manner of operation, however, will be described more fully later. In order to make the operation continuous, one or more of the reactors is employed as the conversion zone at all times while the catalytic material in the other or others is undergoing reactivation. For the purpose of illustration, therefore, assume that reactor A is on process and the catalytic material in reactor B is undergoing reactivation.

Switching of the stream of reactants and reactivating gases is accomplished by means of inlet valves V1 and V3 and switching of the conversion products and spent reactivating gases is accomplished by means of valves V2 and V4. Any suitable valve arrangement capable of switching the direction of the flow of the reactants and reactivating gases may be employed within the scope of the invention. However, for the sake of simplifying the description and illustrating the process without unnecessary complications, each of the switching valves employed is illustrated as either a 4-way valve or a 3-way valve, the passageways of which may be shifted from the positions illustrated in Figs. 3, 4, and 5 to the positions illustrated in Figs. 3A, 4A, and 5A. In the description which follows, with reactor A on process and the catalytic material in reactor B undergoing reactivation, valves V1, V2, and V3 are each adjusted to the position illustrated in Fig. 3A while valve V4 is adjusted to the position illustrated in Fig. 3.

With the valves adjusted to the positions described above, the reactants heated to the desired conversion temperature are introduced to the system through line 5 by means of which they are directed to valve V1. The reactants pass through valve V1 into line 6 by means of which they are introduced to reactor A. The reactants pass through the successive beds of catalytic material in reactor A and while in contact therewith the desired reaction is effected. Reaction products are discharged from reactor A through line 7 by means of which they are directed to valve V2 wherethrough they pass into line 8 by means of which they may be conducted to separation and collection equipment or to any desired further treatment. No external heat is supplied to reactor A during the conversion treatment, the reaction being accomplished under substantially adiabatic conditions utilizing sensible heat in the reactants as the heat of conversion.

Concurrently with the conversion treatment being accomplished in reactor A, the catalytic material in reactor B may be reactivated by contacting therewith a suitable inert gas, such as combustion gases containing controlled amounts of air or oxygen. Reactivating gases with the desired oxygen content and at the desired reactivating gas temperature are supplied to valve V1 in the manner to be described later, wherethrough they pass into line 9 by means of which they are supplied to the first compartment in reactor B. When the oxygen-containing reactivating gases are brought in contact with the catalytic material the carbonaceous substances deposited thereon during the previous processing period are burned and removed as combustion gases. The partially spent combustion gases leaving the first compartment containing at least some of the heat of reactivation as sensible heat are collected in compartment 4 wherefrom regulated portions are withdrawn through lines 10 and 11 to valve V4, wherethrough they pass into line 12 subsequently combining with other spent reactivating gases removed in the manner to be described later. Cool reactivating gases supplied to valve V3 in the manner to be described later pass therethrough into line 13 and thence into line 14 by means of which they are introduced to the upper portion of the next successive compartment wherein they are commingled with the other portion of the partially spent reactivating gases supplied to this comparment from the preceding comparment through perforated plate 2. Cooled reactivating gases are introduced to each successive compartment in the manner above described, while at least part of the spent reactivating gases are withdrawn after each pass of the reactivating gases through the catalytic material in the various compartments, cooler reactivating gases being introduced to each successive compartment in the manner above described to cool the gases leaving the preceding compartment.

Spent reactivating gases are withdrawn from reactor B by way of line 15 by means of which they are supplied to valve V2 wherethrough they pass into line 16, commingling therein with the other spent reactivating gases withdrawn in the manner above described and supplied to line 16 by way of line 12.

The spent reactivating gases may be recycled to the system in the following manner: A portion or all of the spent gases in line 16 may be withdrawn from the system by way of line 17 and valve 18 and preferably a portion corresponding to the excess in the system resulting from the combustion of the carbonaceous materials in reactor B and due to the introduction of impurities, such as nitrogen, with the oxygen introduced, which will be described later. The remaining portion of the spent reactivating gases in line 16 may be directed through valve 19 to compressor 20. Compressor 20 discharges through line 21 and a portion of the gases in line 21 is directed through valve 22 into heat exchanger 23. The reactivating gases introduced to heat exchanger 23 may be either heated or cooled, this being dependent on the amount of cooling which results from the introduction of the oxygen-containing gas to the reactivating gas stream. Reactivating gases at the desired temperature are discharged from heat exchanger 23 through line 23 and are directed through valve 25, commingled with an oxygen-containing gas in the manner to be described, and the mixture supplied to valve V1 for use as above described. When desired, and particularly at the start of the operation, fresh reactivating gases may be supplied to the system by way of line 26, valve 27, and line 24.

The remaining portion of the reactivating gases in line 21 is directing through line 28 and valve 29 into heat exchanger 30 where it is preferably cooled by indirect heat exchange with a suitable cooling medium introduced to heat exchanger 30 by well known means. The cooled reactivating gases leaving heat exchanger 30 are directed through line 31 and valve 32 to valve V3 for use as above described. Air or oxygen for use in reactivation may be introduced by way of line 33 and valve 34 into line 35. A portion thereof may be directed through valve 36 into line 24 for use as above described and the remaining portion thereof may be directed through valve 37 into line 31 wherein it commingles with the cooled reactivating gases in line 31 for use in reactivating as above described.

While the catalytic material in reactor B is undergoing reactivation, in order to prevent diffusion of the reactants through or condensation in the various lines and valves leading from intermediate points in reactor A, a suitable inert gas, such as steam, hydrogen, or some hydrocarbon gas, may be introduced through line 38 and valve 39 to line 40. Valve 41 being closed, the gas introduced to line 40 is directed through valve V3 into line 42 and thence into line 43 by means of which it is introduced in relatively small quantities to the various compartments. Similarly, and for the same purpose, an inert gas may be introduced through line 44 and valve 45 to line 46. Valve 47 being closed, the inert gas in line 46 is directed through valve V4 into line 48 and thence into line 49 by means of which it is supplied to compartments 4 for the above mentioned purpose.

When the catalytic material in reactor A approaches the state of reduced activity, at which time it is advantageous to apply freshly regenerated catalyst for the treatment of the reactants, the supply of air to the reactivating gas stream is momentarily discontinued so that reactor B is purged of oxygen-containing gases. After the purging in reactor B is completed, valves V1, V2, and V3 are switched to the position illustrated in Fig. 3 and valve V4 is switched to the position illustrated in Fig. 3A, at which time oxygen-containing gases are introduced to reactor A and the reactants to reactor B. When desired suitable provisions may be made for preventing contamination between the various streams by the proper regulation of the switching valves. Means for accomplishing this, however, are well known and are therefore not illustrated.

After all the valves have been adjusted to their new positions, the flow of reactants in line 1 will be through valve V1 into line 9 by means of which it is supplied to reactor B, passing therethrough in contact with the mass of catalytic material in order to effect the desired reaction. Conversion products from reactor B are withdrawn by way of line 15 and directed through valve V2 into line 8, the products thereafter being subjected to any desired further treatment. During the process period in reactor B, the inert gas in line 40 introduced as above described is directed through valve V3 into line 13 and thence through line 14 into the various compartments in reactor B to prevent loss of valuable hydrocarbons by diffusion through these lines. Simultaneously therewith, the inert gas introduced to line 46 as previously described is directed through valve V4 into line 11 and thence through line 10 into compartments 4 for the purpose of preventing loss of valuable hydrocarbons by condensation in the various lines.

While reactor B is on process, reactivating gases in line 24 are directed through valve V1 into line 6 by means of which they are introduced to reactor A. Reactivating gases after passing through the first bed of catalytic material in reactor A are cooled by withdrawing a portion thereof through line 49 after which it is directed through line 48 to valve V4 and thence through line 12 into line 16 for treatment as above described. A portion of the reactivating gases withdrawn is replaced by a cooler portion introduced by way of line 31, valve V3, lines 42 and 43 and these cooler reactivating gases contacted with the next successive bed of catalytic material. The treatment above described is followed after the reactivating gases have passed through each successive bed of catalytic material, the flow of reactivating gases to reactor A being continuous until the catalytic material contained therein is substantially completely reactivated. The reactivating gases leaving the last bed of catalytic material in reactor A are directed through line 7 to valve V2 wherethrough they pass into line 16 for treatment as described.

In another manner of operating the process of the invention, partition plates 2 may be solid plates, in which case each compartment in reactors A and B will operate as a separate conversion zone. Assuming then that reactor A is on process and the catalytic material in reactor B is undergoing reactivation, valves V1, V2, and V3 are each adjusted to the position illustrated in Fig. 3A while valve V4 is adjusted to the position illustrated in Fig. 3. In this case, the reactants will be supplied in the desired proportion to valve V1 by way of line 5 and to valve V3 by way of line 5, line 40, and valve 41. The reactants supplied to valve V1 pass therethrough into line 6 by means of which they are introduced to the first compartment in reactor A. Simultaneously therewith, reactants supplied to valve V3 pass therethrough into line 42 and thence into line 43 by means of which they are introduced to the various other compartments in reactor A. Conversion products from the various compartments in reactor A are withdrawn by way of respective lines 7 and 49. Those in line 49 are then directed through line 48 to valve V4 wherethrough they pass into line 46 and thence through valve 47 into line 8, while the conversion products in line 7 pass through valve V2 into line 8, commingling therein with the other conversion products supplied to this line by way of line 46 as above described.

Reactivating gases are supplied to the individual compartments in reactor B by way of line 24, valve V1, and line 9, and by way of line 31, valve V3, and lines 13 and 14. Spent reactivating gases are withdrawn from the separate compartments by way of respective lines 10 and 15, those in line 10 being directed through line 11 and thence through valve V4 into line 12 by means of which they are supplied to line 16, and those in line 15 being directed through valve V2 into line 16, commingling therein with the other spent reactivating gases supplied to this line as above described, the treatment of reactivating gases from this point on being substantially as above described.

When the catalytic material in reactor A approaches the state of reduced activity, whereupon it becomes desirable to employ fresh or freshly regenerated catalysts, switching valves may be adjusted to the positions necessary to provide for introducing reactivating gases to reactor A and reactants to reactor B. Further description in this connection is unnecessary, the flow from this point on being obvious to any skilled in the art.

In another manner of operating the process of the invention, we may employ, for example, a plurality of reactors each containing a single bed of catalytic material. The reactors are preferably grouped, such as illustrated in Fig. 2, so that while one group of reactors is on process the catalytic material in another group may be undergoing reactivation. In Fig. 2 each group is shown as consisting of three reactors, however, a greater or lesser number may be employed, when desired. In the illustration shown in Fig. 2, the reactants may be divided into a plurality of parallel streams corresponding to the number of reactors in the group on process and each stream is supplied to a separate reactor or, when desired, a stream of reactants may be passed through the various reactors in each group in series. Provisions are also made for supplying reactivating gases to the group of reactors containing the catalytic material undergoing reactivation in the same manner, i. e., the reactivating gases may be divided into a plurality of parallel streams which are separately introduced to the separate reactors or the reactivating gases may be passed through the various reactors in series. When desired, suitable provisions may be made for cooling the reactivating gas stream when the reactors are connected in series as the stream passes from one reactor to the next although the means for accomplishing this is not illustrated.

In the preferred operation, the stream of reactants may be passed through the various reactors on process, either in parallel or in series, but the reactivating gases are preferably supplied to the various reactors in parallel streams. Assuming then that reactors C, D, and E are on process and the catalytic material in reactors F, G, and H is undergoing reactivation, valve V5 is adjusted to the position illustrated in Fig. 3A while valve V6 is adjusted to the position illustrated in Fig. 3. Valves V7, V8, V13, and V14 are each adjusted to the position illustrated in Fig. 4 while valves V9, V10, V11, and V12 are each adjusted to the position illustrated in Fig. 5A.

Reactants supplied by way of line 50 are directed through valve V5 into line 51 by means of which they are introduced to reactor C, passing therethrough in contact with the catalytic material contained therein. The products from reactor C are directed through line 52 and valve V9 into line 53 and thence through valve V7 into line 54 by means of which they are introduced to reactor D. The products from reactor D are directed through line 55 and valve V10 into line 56 and thence through valve V8 into line 57 by means of which they are introduced to reactor E. The products from reactor E are directed through lines 58 and 59 into valve V6 wherethrough they pass into line 60 by means of which they may be supplied to suitable collection and separation equipment or subjected to any desired further treatment.

The oxygen-containing reactivating gases in line 61 are directed through valve V5 into line 62 wherein the reactivating gases are divided into three parallel streams and the first supplied to reactor F by way of line 63, valve V11, and line 64 and the second stream supplied to reactor G by way of line 65, valve V12, and line 66 and the third stream supplied to reactor H by way of line 62. Spent reactivating gases are withdrawn from reactor H by way of line 67, pass through valve V14 into line 68, and combine therein with spent reactivating gases withdrawn from reactor G by way of line 69, valve V13, and line 70 and with spent reactivating gases withdrawn from reactor F by way of line 71. The mixture of spent reactivating gases in line 68 are thereafter directed through valve V6 into line 72 and discharged from the process or may be recycled in the manner described in connection with Fig. 1.

When the catalytic material in reactors C, D, and E approaches the state of reduced activity whereupon it becomes desirable to employ fresh or freshly regenerated catalysts, the stream of reactants and reactivating gases may be switched, whereupon the reactants are supplied to reactors F, G, and H and the stream of reactivating gases to the reactors C, D, and E. Switching of the streams may be accomplished by adjusting the position of valve V5 to that illustrated in Fig. 3 and valve V6 to the position illustrated in Fig. 3A. In addition, valves V7, V8, V13, and V14 are each adjusted to the position illustrated in Fig. 4A while valves V9, V10, V11, and V12 are each adjusted to the position illustrated in Fig. 5.

In this case, the flow of reactants will be through valve V5 into line 62, thence through reactor H into line 67, through valve V14 into line 74, through reactor V12 into line 66, thence through reactor G into line 69, through valve V13 into line 73, through valve V11 into line 64, thence through reactor F into line 71, after which they may be conducted through line 68 to valve V6 wherethrough they pass into line 60. The stream of reactivating gases passes through valve V5 into line 51 and thence in parallel through reactors C, D, and E, one stream being introduced through reactor C by way of line 51, another stream through reactor D by way of line 75, valve V7, and line 54, and another stream to reactor E by way of line 76, valve V8, and line 57. Spent reactivating gases are withdrawn from reactor C by way of line 52 and are directed through valve V9 into line 59, commingling therein with spent reactivating gases withdrawn from reactor D by way of line 55, valve V10, and line 77, and with spent reactivating gases withdrawn from reactor E by way of line 58, after which the commingled reactivating gases are directed through valve V6 into line 72.

Various modifications of the process above described are possible by a simple manipulation of the various switching valves, such as, for example, operating the group of reactors to which the reactivating gases are supplied in series, while the group to which the reactants are supplied is operated in parallel, and since all these modifications are apparent by mere reference to the drawings, any further description is unnecessary.

An example of one specific operation of the process as it may be accomplished in an apparatus such as illustrated and above described is approximately as follows: The charging stock comprising a 36° A. P. I. gravity Mid-Continent gas oil is heated and vaporized at a temperature of 950° F. and at a superatmospheric pressure of 40 pounds per square inch. The heated reactants are introduced to a reactor containing three beds of catalytic material, the reactants passing through each successive bed in series.

The conversion products from the reactor are fractionated to separate gasoline boiling range hydrocarbons corresponding to approximately 40% by volume of the charging material and the gasoline and intermediate conversion products separately recovered.

Simultaneously therewith the catalytic material contained in another reactor likewise containing three beds of catalytic material is subjected to reactivation in the presence of combustion gases containing approximately 2% oxygen the mixture having been preheated to a temperature of approximately 900° F. A portion of the spent reactivating gases and combustion products leaving the first bed of catalytic material is withdrawn from the system and the reactivating gas volume is readjusted to its original volume and temperature by the introduction of cooler combustion gases and air formed in the manner to be described later. The spent reactivating gases and combustion products leaving each successive bed of catalytic material are treated in the manner above described, i. e., a portion is withdrawn and the residual portion thereof readjusted to the original volume and temperature. Spent reactivating gases and combustion products leaving the last bed of catalytic material are commingled with the other spent reactivating gases and combustion products removed as above described, and a portion corresponding in volume to the combustion products formed in reactivating the catalyst is removed and discharged from the system while the remaining portion thereof is separated into two further portions, one of which is cooled to the desired reactivating temperature, after which air is added to increase its oxygen concentration to approximately 2% and the mixture thereafter supplied to the first bed of catalytic material. The other further portion is cooled to a temperature below the reactivating gas temperature and sufficient air added to this portion so that upon introduction of this mixture in the intermediate points in the reactor, as above described, the oxygen concentration in the reactivating gases entering the next successive bed of catalytic material is of the desired value and at the desired temperature.

We claim as our invention:

1. In a process employing a relatively large mass of catalyst which becomes carbonized upon use wherein said mass is divided into a series of relatively small beds, the method of regenerating the carbonized catalyst mass while maintaining a substantially uniform regenerating temperature which comprises passing a stream of oxygen-containing gas in series through said beds to burn carbonaceous matter therefrom, removing a portion of the gases from said stream between successive beds and adding relatively cool oxygen-containing gas to the stream between the successive beds to adjust the temperature and oxygen concentration thereof.

2. The method of claim 1 further characterized in that at least a portion of the gases removed from the stream of regenerating gases are cooled, the oxygen concentration modified and the thus modified gases returned to the stream of regenerating gases as said cool oxygen-containing gas.

3. The process of claim 1 further characterized in that said series of beds are situate within the same reaction zone.

KENNETH M. WATSON.
ROBERT L. SMITH.